United States Patent
Ota

(10) Patent No.: US 10,109,036 B2
(45) Date of Patent: Oct. 23, 2018

(54) IMAGE PROCESSING APPARATUS, CONTROL METHOD FOR SAME, AND PROGRAM THAT PERFORMS IMAGE PROCESSING FOR IMAGE DATA HAVING A FOCUS STATE THAT IS CHANGEABLE

(71) Applicant: CANON KABUSHIKI KAISHA, Tokyo (JP)

(72) Inventor: Yuya Ota, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/444,676

(22) Filed: Feb. 28, 2017

(65) Prior Publication Data
US 2017/0169542 A1    Jun. 15, 2017

Related U.S. Application Data

(62) Division of application No. 14/457,495, filed on Aug. 12, 2014, now Pat. No. 9,621,797.

(30) Foreign Application Priority Data

Aug. 21, 2013    (JP) .................................. 2013-170912

(51) Int. Cl.
G02B 13/16    (2006.01)
H04N 5/225    (2006.01)
(Continued)

(52) U.S. Cl.
CPC ................ *G06T 3/40* (2013.01); *G06T 7/557* (2017.01); *G06T 7/74* (2017.01); *H04N 5/23212* (2013.01);
(Continued)

(58) Field of Classification Search
CPC .. G06T 3/40; G06T 7/74; G06T 7/557; G06T 2207/10028; G06T 2210/22; H04N 5/23212; H04N 5/2628; H04N 5/23229
(Continued)

(56) References Cited

U.S. PATENT DOCUMENTS 7,046,290 B2    5/2006    Nozaki
8,558,941 B2    10/2013    Nozaki
(Continued)

FOREIGN PATENT DOCUMENTS

JP    H10-79882 A    3/1998
JP    2001-208961 A    8/2001
(Continued)

OTHER PUBLICATIONS

Office Action dated Jul. 25, 2017, in Japanese Patent Application No. 2013-170912.

*Primary Examiner* — Yogesh Aggarwal
(74) *Attorney, Agent, or Firm* — Fitzpatrick, Cella, Harper & Scinto

(57) ABSTRACT

An image processing apparatus that performs image processing on an image having light-field image data having a focus state that is changeable after shooting of the image. The image processing apparatus includes a processor and a memory storing a program which, when executed by the processor, causes the processor to function as a specifying unit configured to specify a trimming area of the image, an acquiring unit configured to acquire information indicating a depth position to be focused in the specified trimming area, a generating unit configured to generate edited light-field image data, a storing unit configured to store the information acquired by the acquiring unit together with the edited light-field image data, a focusing unit configured to bring the specified trimming area into focus, and an output unit
(Continued)

configured to output an image that includes the specified trimming area that is brought into focus.

30 Claims, 10 Drawing Sheets

(51) Int. Cl.
*G06T 3/40* (2006.01)
*H04N 5/232* (2006.01)
*G06T 7/73* (2017.01)
*G06T 7/557* (2017.01)
*H04N 5/262* (2006.01)

(52) U.S. Cl.
CPC ....... *H04N 5/23229* (2013.01); *H04N 5/2628* (2013.01); *G06T 2207/10028* (2013.01); *G06T 2210/22* (2013.01)

(58) Field of Classification Search
USPC ................ 348/335, 340, 345, 348, 350, 352
See application file for complete search history.

(56) References Cited

U.S. PATENT DOCUMENTS

| | | | |
|---|---|---|---|
| 8,929,677 B2 | 1/2015 | Lim et al. | |
| 8,971,662 B2 | 3/2015 | Fukata et al. | |
| 2002/0057847 A1* | 5/2002 | Hayashi | H04N 1/00427 382/282 |
| 2006/0139478 A1 | 6/2006 | Nozaki | |
| 2010/0265385 A1* | 10/2010 | Knight | H04N 5/232 348/340 |
| 2011/0273471 A1* | 11/2011 | Nagasaka | H04N 5/23212 345/619 |
| 2011/0305446 A1 | 12/2011 | Itoh | |
| 2014/0098191 A1* | 4/2014 | Rime | H04N 5/2254 348/46 |

FOREIGN PATENT DOCUMENTS

| | | |
|---|---|---|
| JP | 2010-166519 A | 7/2010 |
| JP | 2013-512612 A | 4/2013 |
| JP | 2013-145980 A | 7/2013 |
| JP | 2013-153375 A | 8/2013 |

* cited by examiner

IMAGE PROCESSING APPARATUS, CONTROL METHOD FOR SAME, AND PROGRAM THAT PERFORMS IMAGE PROCESSING FOR IMAGE DATA HAVING A FOCUS STATE THAT IS CHANGEABLE

CLAIM OF PRIORITY

This application is a divisional of U.S. patent application Ser. No. 14/457,495, filed Aug. 12, 2014, now, U.S. Pat. No. 9,621,797, which claims the benefit of Japanese Patent Application No. 2013-170912, filed on Aug. 21, 2013, which is hereby incorporated by reference herein in its entirety.

BACKGROUND OF THE INVENTION

Field of the Invention

The present invention relates to a technique that performs image processing for image data of which the focus range is changeable after shooting.

Description of the Related Art

There is known a camera (light-field camera, hereafter also referred to as "LF camera") that is capable of recording light information (light field, hereafter also referred to as "LF") in three dimensional space by utilizing a special lens and a high-resolution sensor. In the LF camera, a micro lens group called "micro lens" is arranged on the front surface of the high-resolution sensor. A plurality of micro lenses corresponds to one light spot and information about light in different direction at a different depth of field is recorded for each micro lens, so that a LF image can be acquired. The focus range and the viewpoint of the LF image captured by the LF camera can be changed after shooting. LF image data includes light beam information indicating the intensity of a light beam relating to the captured image and directional information about the light beam.

Japanese Patent Laid-Open No. 2001-208961 discloses a technique for obtaining an image which is in focus on an object or a main object intended by a photographer within a cutout range when the object is photographed by a camera. Japanese Patent Laid-Open No. H10-79882 discloses a technique that performs input adjustment (e.g., focus adjustment, exposure adjustment, and color adjustment) for a cutout image upon cutout execution of the image to be input from an electronic camera to a personal computer.

However, the number of pixels has been increasing due to the advancement of technique for an imaging element. In such circumstances, it is expected that the LF camera may become popular because the LF camera can effectively use pixels by allocating them not only to resolution directions but also to a plurality of micro lenses. Although the focus range or the like of the LF image can be changed after shooting, the focus range of the LF image must be determined upon display thereof. Thus, it is typical to append the focus range upon, for example, shooting as the focus range of the initial setting (hereafter referred to as "default focus range") from the viewpoint of convenience of use.

When an extra video portion is captured into a photographed image, it is typical for a user to perform trim editing for extracting a desired object image in order to adjust the composition of the image. On the other hand, when trim editing is performed for the LF image, it is contemplated that the focus state of a trimming area set as the default focus range may be inappropriate. For example, assume that a user wants to trim the video portion of flowers in a landscape image. In this case, when the default focus range is set on the background side such as mountains and buildings located on the far side of the flowers, the flowers on the front side are out of focus. When a user performs enlargement processing for enlarging the circumference of a desired object image in the photographed image in order to confirm the details of the image content, it is also contemplated that the focus state of the enlargement area may be inappropriate.

SUMMARY OF THE INVENTION

The present invention provides an image processing apparatus that performs image processing for image data of which the focus range is changeable after shooting. The image processing apparatus changes a focus range depending on a target range after trimming processing or after enlargement processing, resulting in an increase in convenience of use.

According to one aspect, the present invention provides an image processing apparatus that performs image processing for image data of which a focus range is changeable after shooting and includes an analyzing unit configured to analyze the image data in a trimming area specified with respect to the image data, a range determining unit configured to determine a focus range of the image data in the trimming area in accordance with a result analyzed by the analyzing unit, a focus range appending unit configured to append information about the focus range determined by the range determining unit to image data after trimming editing, and a storage unit configured to store the image data after trim editing and information about the focus range appended by the focus range appending unit.

According to another aspect, the present invention provides an image processing apparatus that performs image processing for image data of which the focus range is changeable after shooting and changes a focus range depending on a target range after trimming processing or after enlargement processing, so that the convenience of use can be enhanced.

Further features of the present invention will become apparent from the following description of exemplary embodiments with reference to the attached drawings.

DESCRIPTION OF THE EMBODIMENTS

Figure 1A:
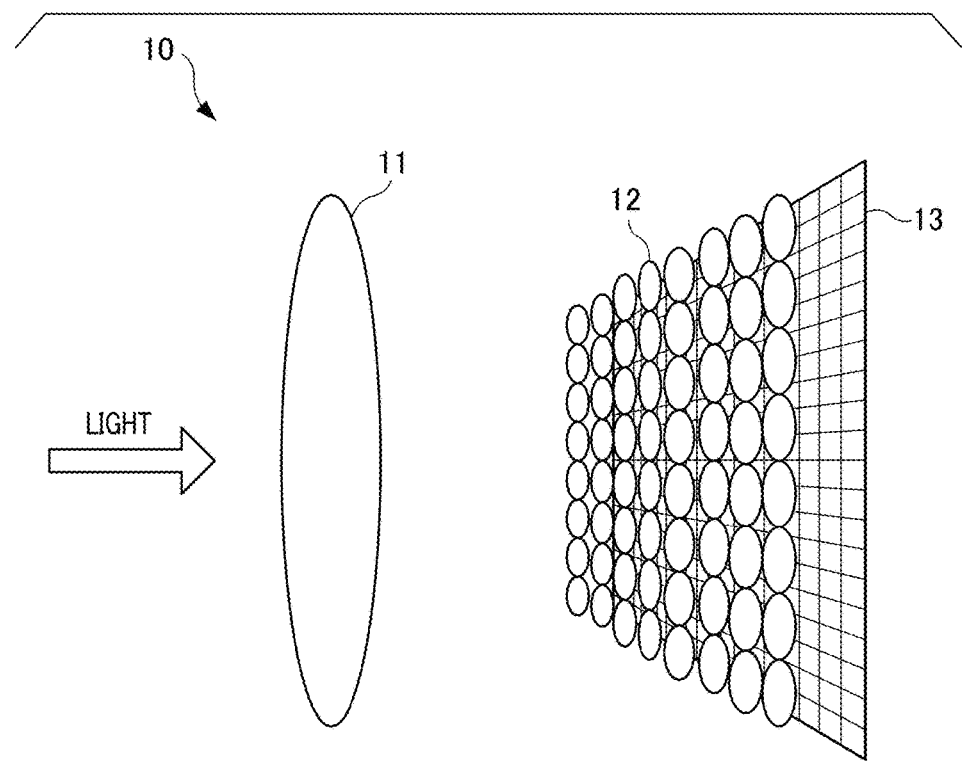
FIG. 1A is a schematic diagram illustrating an example of the internal configuration of a light-field camera.
Figure 1B:
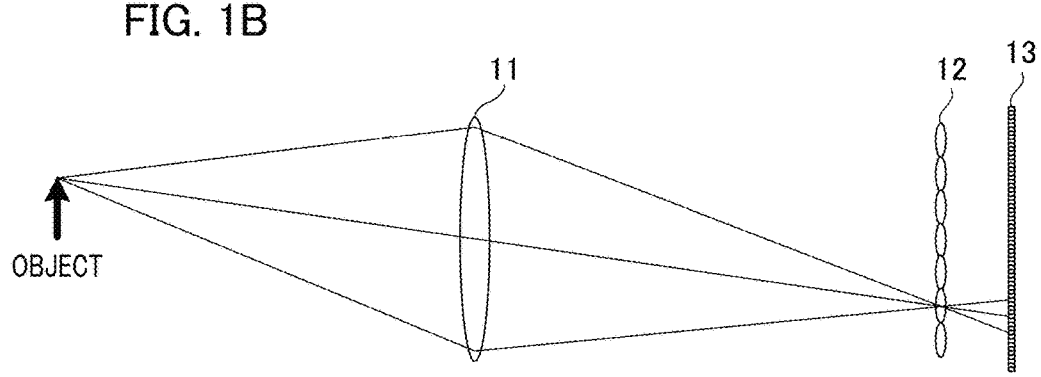
FIG. 1B is a schematic diagram illustrating an example of the internal configuration of a light-field camera.

Hereafter, preferred embodiments of the present invention will be described with reference to the drawings. Prior to the description of a video processing apparatus according to the embodiments of the present invention, a description will be given of an imaging apparatus for use in capturing a moving image of which the focus state can be specified. FIGS. 1A and 1B are schematic diagrams illustrating an example of the internal constitution of a LF camera. Light from an object, which is incident on a micro lens array 12 by passing through an imaging lens 11, is photoelectrically converted into an electrical signal by an image sensor 13. Note that the obtained imaging data is referred to as "light-field data" (hereafter referred to as "LF data").

The imaging lens 11 projects light from an object onto the micro lens array 12. The imaging lens 11 is an interchangeable lens that is mounted to the main body of an imaging apparatus 10. A user can change an imaging magnification by the zoom operation of the imaging lens 11. The micro lens array 12 is constituted by arranging a plurality of micro lenses in a grid and is located between the imaging lens 11 and the image sensor 13. Each of micro lenses constituting the micro lens array 12 divides incident light from the imaging lens 11 into divided light components and outputs the divided light components to the image sensor 13. The image sensor 13 constituting the imaging unit is an imaging element having a plurality of pixels, where the intensity of light is detected by each pixel. The respective lights divided by each micro lens are incident on each pixel of the image sensor 13 for receiving light from an object.

Figure 2:
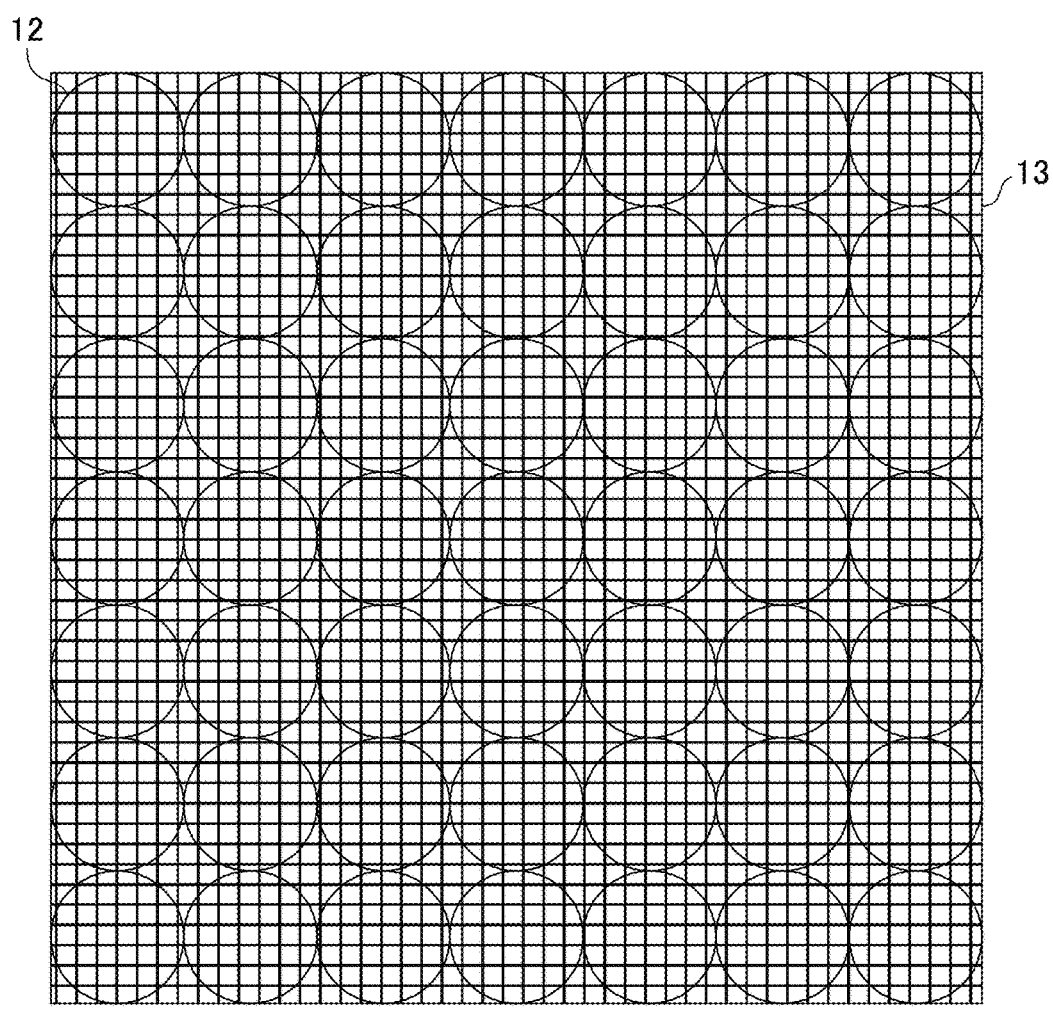
FIG. 2 is a schematic diagram illustrating the positional relationship between a micro lens array 12 and each pixel of an image sensor 13.

FIG. 2 is a schematic diagram illustrating the positional relationship between the micro lens array 12 and each pixel of the image sensor 13. Each micro lens of the micro lens array 12 is arranged so as to correspond to a plurality of pixels of the image sensor 13. Light divided by each micro lens is incident on each pixel of the image sensor 13, and the intensity of light (light beam information) from different directions can be detected by each pixel. Also, the incidence direction (directional information) of a light beam incident on each pixel of the image sensor 13 via micro lenses can be found depending on the positional relationship between each micro lens and each pixel of the image sensor 13. In other words, information about the direction of travel of light is detected in conjunction with the intensity distribution of light. An image in a focal plane having different distances from the lens vertex surfaces of the micro lens array 12 is obtained by combining the outputs of the pixels of the image sensor 13, which are placed at positions corresponding to the eccentricity from the optical axis of each micro lens. Note that a light beam is represented by a function which is parameterized by parallel two planes using parameters such as a position, an orientation, a wavelength, or the like. In other words, the direction of light incident on each pixel is determined by the arrangement of a plurality of pixels corresponding to each micro lens.

As described above, the imaging apparatus 10 acquires light beam information and directional information and then performs light beam rearrangement/calculation processing (hereafter referred to as "reconstruction") to thereby be able to generate image data of any focus position or any viewpoint. The light beam information and directional information are included in LF data.

Figure 3:
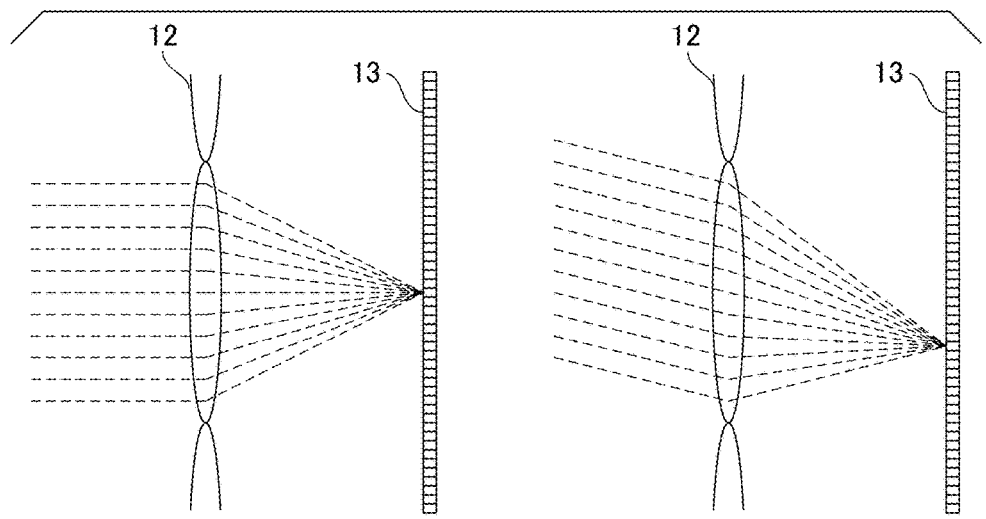
FIG. 3 is a schematic diagram illustrating the relationship between the direction of travel of a light beam incident on a micro lens and the recording area of the image sensor 13.

FIG. 3 is a schematic diagram illustrating the relationship between the direction of travel of a light beam incident on the micro lens of the micro lens array 12 and the recording area of the image sensor 13. An object image formed by the imaging lens 11 is focused on the micro lens array 12, and a light beam incident on the micro lens array 12 is received by the image sensor 13 via the micro lens array 12. At this time, as shown in FIG. 3, a light beam incident on the micro lens array 12 is received at different positions on the image sensor 13 depending on the direction of travel of light, and thus, an object image having a shape similar to that of the imaging lens 11 is focused for each micro lens.

Figure 4:
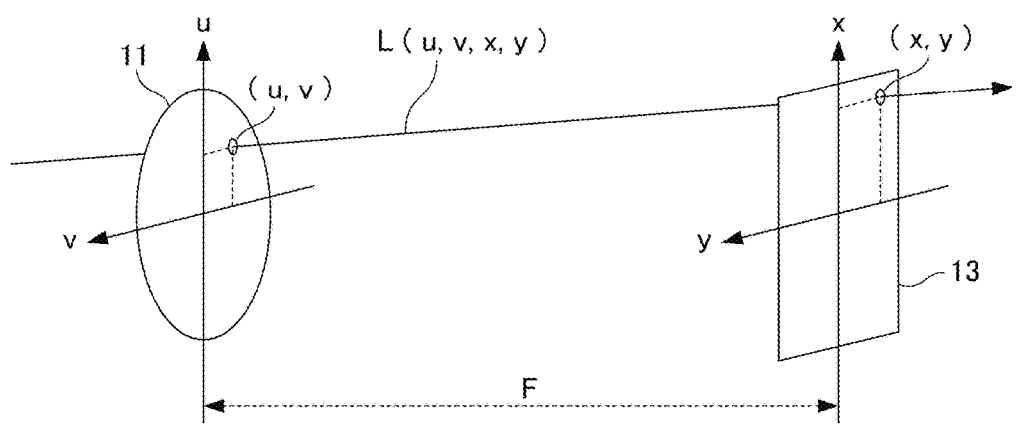
FIG. 4 is a schematic diagram illustrating information about a light beam incident on the image sensor 13.

FIG. 4 is a schematic diagram illustrating information about a light beam incident on the image sensor 13. A description will be given of a light beam received by the image sensor 13 with reference to FIG. 4. Here, an assumption is made that the orthogonal coordinate system on the lens plane of the imaging lens 11 is given as (u, v), the orthogonal coordinate system on the imaging plane of the image sensor 13 is given as (x, y), and the distance between the lens plane of the imaging lens 11 and the imaging plane of the image sensor 13 is given as F. Thus, the intensity of a light beam passing through the imaging lens 11 and the image sensor 13 can be represented by the four-dimensional function L (u, v, x, y). Since a light beam incident on each micro lens is incident on different pixels depending on the direction of travel of light, the four-dimensional function L (u, v, x, y) for holding not only light beam positional information but also the direction of travel of a light beam are recorded on the image sensor 13.

Figure 5:
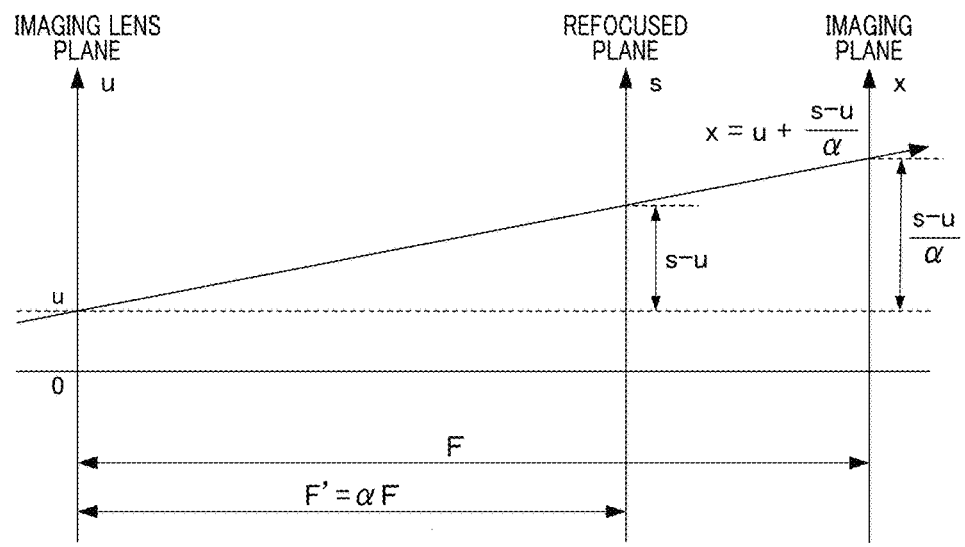
FIG. 5 is a schematic diagram illustrating refocusing calculation processing.

Next, a description will be given of refocusing calculation processing after imaging. FIG. 5 is a schematic diagram illustrating refocusing calculation processing. When the positional relationship among the imaging lens plane, the imaging plane, and the refocused plane is set as shown in FIG. 5, the intensity L' (u, v, s, t) of a light beam in the orthogonal coordinate system (s, t) on the refocused plane is represented by the following Formula (1):

[Formula 1]

$$L'(u, v, s, t) = L\left(u, v, u + \frac{s-u}{\alpha}, v + \frac{t-v}{\alpha}\right) \quad (1)$$

Also, since an image E' (s, t) obtained on a refocused plane is obtained by integrating the intensity L' with respect to the lens aperture, the image E' (s, t) is represented by the following Formula (2):

[Formula 2] (2)

$$E'(s, t) = \frac{1}{\alpha^2 F^2} \int\int L\left(u, v, u + \frac{s-u}{\alpha}, v + \frac{t-v}{\alpha}\right) du\, dv$$

Thus, refocusing calculation processing is performed by using Formula (2), so that an image set to any focus point (refocused plane) can be reconstructed.

Next, a description will be given of depth of field adjustment processing after imaging. Prior to refocusing calculation processing, weighting is performed by multiplying a weighting coefficient for each image data that forms an image area assigned to each micro lens. For example, when an image with a deep depth of field wants to be generated, integration processing is performed only by using information about a light beam incident on the light receiving plane of the image sensor 13 at a relatively small angle. In other words, for a light beam incident on the image sensor 13 at a relatively large angle, integration processing is not performed by multiplying a weighting coefficient "0" (zero).

Figure 6:
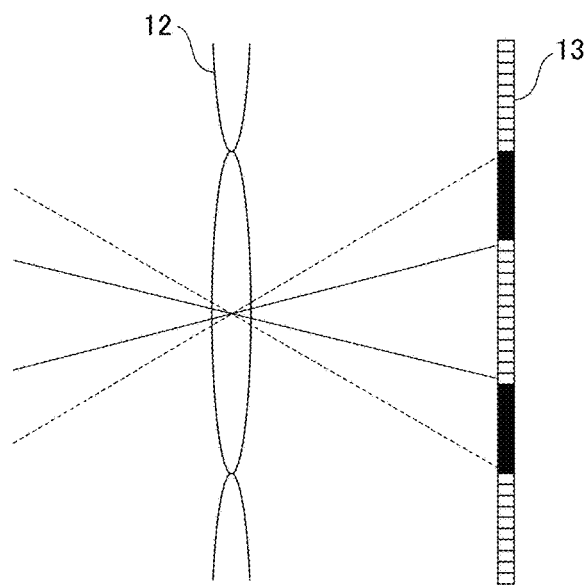
FIG. 6 is a schematic diagram illustrating the relationship between the difference in angle of incidence on a micro lens and the recording area of the image sensor 13.
Figure 7:
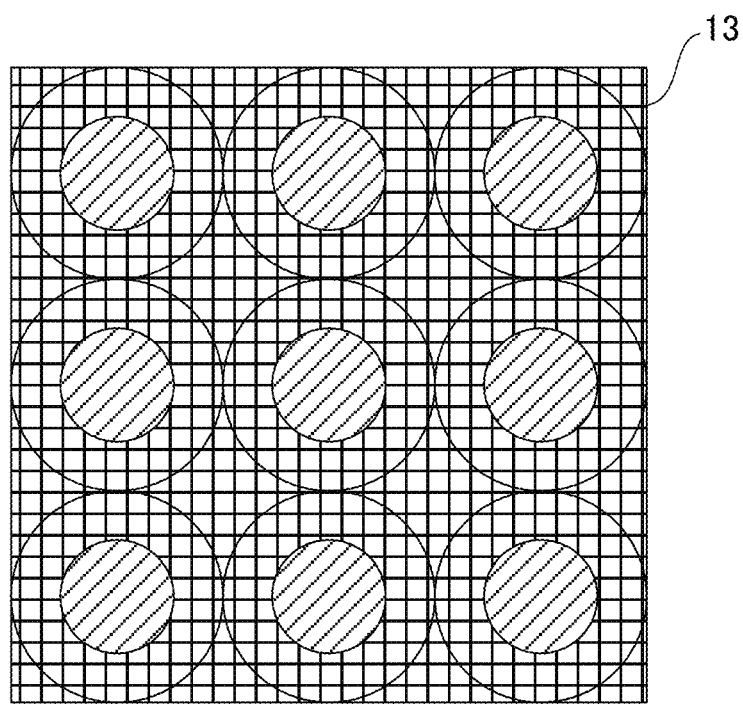
FIG. 7 is a schematic diagram illustrating depth of field adjustment processing.

FIG. 6 is a schematic diagram illustrating the relationship between the difference in angle of incidence on a micro lens and the recording area of the image sensor 13. FIG. 7 is a schematic diagram illustrating depth of field adjustment processing. As shown in FIG. 6, a light beam of which the angle of incidence to the image sensor 13 is relatively small is positioned at more central area. Thus, as shown in FIG. 7, integration processing is performed only by using pixel data acquired at the central portion (hatched portion in FIG. 7) of the area. With the aid of such processing, an image with a deep depth of field can be expressed as if an aperture diaphragm provided in a typical imaging apparatus is stopped down. A pan focus image with a deeper depth of field can also be generated by further reducing pixel data for use at the central portion of the area. As described above, the depth of field of an image after shooting can be adjusted based on the actually acquired LF data (light beam information). In the embodiments, a description will be given by illustrating an image processing apparatus for editing a LF image.

First Embodiment

Figure 8:
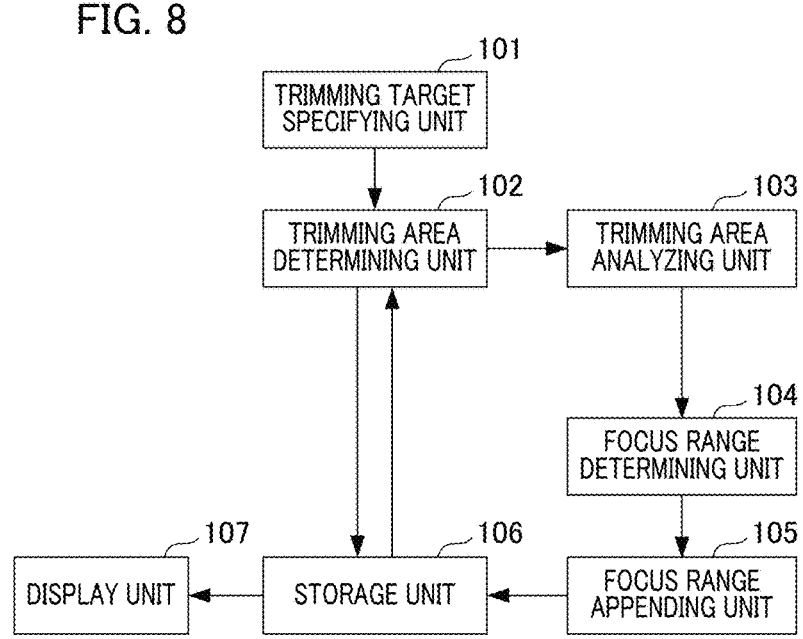
FIG. 8 is a block diagram illustrating a configuration of an apparatus according to a first embodiment of the present invention.

A description will be given of an exemplary configuration of a system according to a first embodiment with reference to FIG. 8. The system provides a LF image editing function to a user and is constituted within an advanced display or a PC (personal computer) including a display or the like. A CPU (Central Processing Unit) implements processing to be described below by executing programs that are read from a memory. Alternatively, a system for performing simple editing after shooting may be provided in an imaging apparatus which is capable of capturing a LF image. In this case, the following system is configured within the LF camera. In addition to the above, an apparatus to which the present invention is applied is not limited provided that it is capable of performing development/editing processing for a LF image. The present invention is applicable to, for example, an apparatus that acquires light beam information and directional information included in LF image data (LF data) and then performs rearrangement and reconstruction of the light beam to thereby be able to generate image data of any focus position or any viewpoint.

A trimming target specifying unit (hereafter referred to as "target specifying unit") 101 is an IF (interface) unit that is used by a user for specifying a trimming area in an image with respect to image data. The target specifying unit 101 is a typical input device such as a pointing device such as a mouse or a touch panel. A trimming target is specified by, for example, the following methods:
   Method for specifying an object.
   Method for specifying a start point and an end point for expressing a rectangular frame.
   Method for specifying any number of points for specifying any polygon.

A trimming area determining unit (hereafter referred to as "area determining unit") 102 determines an area as a trimming target based on the content specified by the target specifying unit 101 and the LF image data stored in a storage unit 106 as a trimming target. For example, when point coordinates for specifying an object are specified by the target specifying unit 101, the area determining unit 102 determines an object area including the specified points as a trimming area by the analysis of the LF image stored in the storage unit 106. Alternatively, when the coordinates of the start point and the end point for expressing a rectangular frame are specified by the target specifying unit 101, the area determining unit 102 determines the rectangular area defined by the start point and the end point as a trimming area within the image. When any number of point coordinates for specifying any polygon is specified by the target specifying unit 101, the area determining unit 102 determines an area surrounded by any number of point coordinates as a trimming area.

A trimming area analyzing unit (hereafter referred to as "area analyzing unit") 103 acquires information about a trimming area from the area determining unit 102 and then analyzes the content of image data in the trimming area. In the present embodiment, when the trimming area is located in a depth direction on a depth map to be described below is analyzed as the analysis content. The depth map includes map data indicating the position of the depth direction of each pixel mapped for an image expressed in two dimensions in vertical and horizontal directions. In the present embodiment, a histogram type depth map indicating the number of pixels which are the counted number (frequency) of pixels present regardless of vertical and horizontal coordinates in the depth direction is used.

Figure 9:
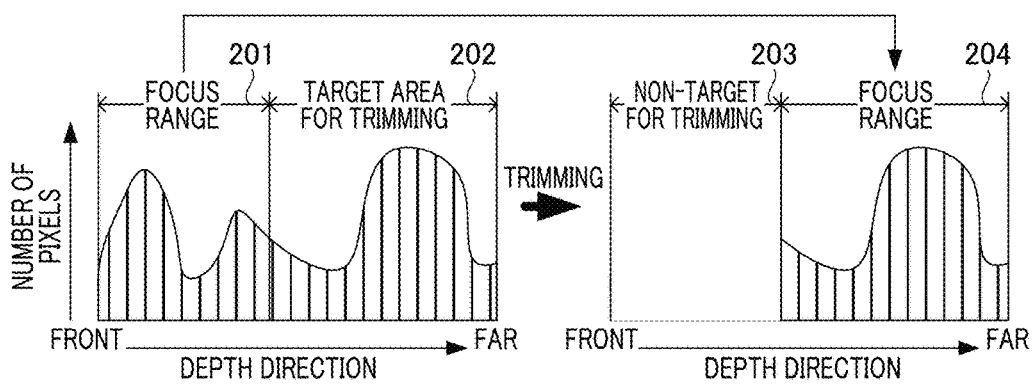
FIG. 9 is a diagram illustrating how a focus range changes before and after editing according to the first embodiment.

FIG. 9 illustrates a depth map according to the present embodiment. For a LF image prior to trim editing, a focus range 201 which is a front side area is set to a default focus range as viewed from the photographer's side. A trimming target area 202 is a far side range which is out of focus. When a user performs trim editing for such a LF image, the image after trim editing is so-called "blurry image" which is out of focus. The area analyzing unit 103 analyzes information about the trimming area acquired from the area determining unit 102. In this manner, it is determined that the trimming target is present in the trimming target area 202 on the depth map. A focus range determining unit 104 determines a focus range based on the result of analysis from the area analyzing unit 103. A description will be given of how a focus range changes after trim editing with respect to a LF image prior to trim editing with reference to FIG. 9. The focus range 201 prior to trim editing is a default focus range appended upon shooting. Note that the focus range may also be referred to as a "depth range" over which the object is brought into focus. The focus range is not limited to a depth range having a predetermined width but may also be referred to as a focus position (depth position at which the object is brought into focus).

During trim editing, a trimming non-target area 203 is excluded and a focus range (see a range 204) is changed from the focus range 201 prior to trim editing to the entire area after trim editing. Consequently, the display image after trim editing becomes a non-blurry image which is in focus. A focus range appending unit 105 appends the range determined by the focus range determining unit 104 as a focus range corresponding to the image obtained as a result of trimming to a LF image obtained as a result of trimming and stores the resulting LF image in the storage unit 106. Information about the determined focus range is in a form stored as the focus range prior to trim editing and is changed to information about the focus range after trim editing. Thus, information about the default focus position is overwritten.

As a storage form of information indicating a focus range, information indicating the focus range is appended as metadata to, for example, the LF image data after trim editing. The use of metadata allows the LF image after trim editing to be displayed in an appropriate focus range upon display of the LF image. For example, the focus range is expressed as positions (two points) in the depth direction on the depth map. More specifically, when the two points are defined as the point A and the point B, the range between the position of the point A to the position of the point B in the depth direction is treated as the focus range.

Note that, in addition to history information obtained upon trim editing, information about the focus range after trim editing may also be additionally recorded in the LF image data prior to trim editing. In this case, the entire data prior to trim editing is stored for the LF image itself. When a user displays an image prior to and after trim editing using history information, the image can be displayed in the focus range which has been changed to an appropriate level in accordance with trim editing. In this case, information indicating the default focus position is not overwritten, and thus, the default focus position upon shooting can be used as it is upon display of an image prior to trim editing.

The storage unit 106 stores LF image data prior to trim editing, LF image data after trim editing obtained from the area determining unit 102, focus range data acquired from the focus range appending unit 105, and associated data such as a thumbnail image. A display unit 107 displays a LF image prior to trim editing and after trim editing. The display unit 107 presents a UI (user interface) screen or the like used by a user upon specifying a trimming target using the target specifying unit 101 to the user. A television apparatus, a PC display, a commercial display, a tablet device, a smart phone, or the like may be used as a display apparatus. When an apparatus is not provided with the display unit 107, image data for display or the like is output from an output unit instead of the display unit 107 to an external device.

According to the present embodiment, when trim editing is performed for a LF image, control is made such that the focus range is changed to an appropriate level depending on the result of trim editing. In other words, the focus range with a high convenience of use for the user is automatically set. When a fine adjustment of the focus range that has been changed upon editing or an additional trim editing is performed, the user can specify the change in focus range again.

Second Embodiment

Next, a description will be given of a second embodiment of the present invention. In the second embodiment, the operations of the area analyzing unit 103 and the focus range determining unit 104 are different from those in the first embodiment. Thus, detailed explanations are omitted by using reference numerals already used for the structural elements that are identical to the case of the first embodiment, and the points of difference will be explained in detail. Such a manner of omitting explanations is identical in the embodiments explained below.

The area analyzing unit 103 analyzes the center coordinate of a trimming area. The area analyzing unit 103 also analyzes the position (hereafter referred to as "mode depth position") on a depth map having the largest number of pixels in the trimming area, that is, having the highest frequency in the trimming area when the number of pixels is set as a frequency. The area analyzing unit 103 not only performs processing described in the first embodiment but also sends information about any one of or both the center coordinate of the trimming area and the mode depth position of the trimming area to the focus range determining unit 104.

The focus range determining unit 104 sets the focus range to the entire trimming area. In this case, the entire area after trim editing may be unable to be brought into focus depending on LF image data prior to trim editing. In the LF camera, the focus range which can be adjusted or changed after shooting is in a finite range under the photographing conditions such as optical properties of a micro lens group, optical properties of a main lens, photographing parameters such as an aperture value. For example, when a distant main object is captured in a not-so-bright environment, a user may set the main lens toward the telescopic side and set the aperture toward the open side. In this state, the focus range is optically narrowed as compared with the settings in which the aperture is stopped down on the wide-angle side.

The focus range determining unit 104 of the present embodiment determines the focus range after trim editing based on any one of the center coordinate of the trimming area or the mode depth position of the trimming area. Firstly, a description will be given of processing for determining a focus range based on the position of the center coordinate of the trimming area. In this case, the range which is settable in the depth direction and the front direction about the position of the depth direction in which a pixel at the center coordinate of the trimming area is present is set as the focus range after trim editing.

Figure 10:
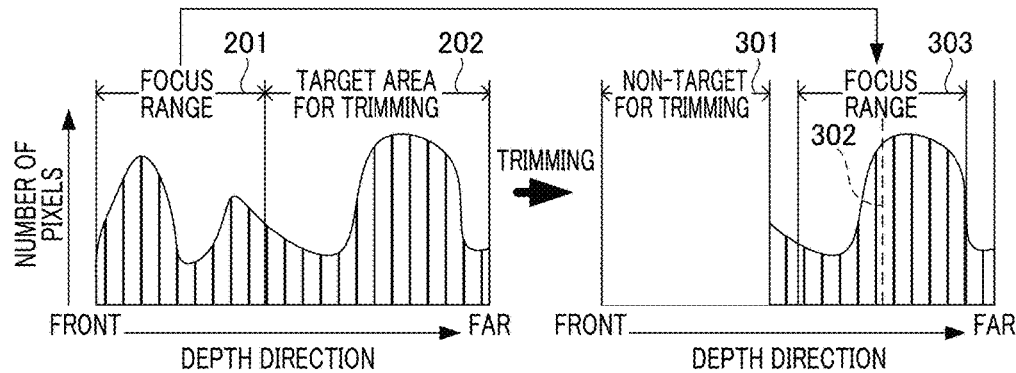
FIG. 10 is a diagram illustrating how a focus range changes with focusing on the center coordinate of a trimming area before and after editing according to a second embodiment of the present invention.

A description will be given of how a focus range changes after trim editing with respect to a LF image prior to trim editing with reference to FIG. 10. FIG. 10 shows the case when the focus range cannot be set to the entire area excluding a trimming non-target area 301 as a result of trim editing for a LF image prior to trim editing.

In this case, a focus range 303 is set in a focusable range about the position 302 on the depth map in which a pixel at the center coordinate of the trimmed area is present. The central portion of the trimming area can be brought into focus as a result of such processing. The central portion of the trimming area is often adequate as a trim editing intention. As described in the first embodiment, an additional fine adjustment or re-change can be made as required.

Next, a description will be given of processing for determining a focus range based on the mode depth position of the trimming area. In this case, the range which is settable in the depth direction and the front direction about the mode depth position of the trimming area is set as the focus range after trim editing.

Figure 11:
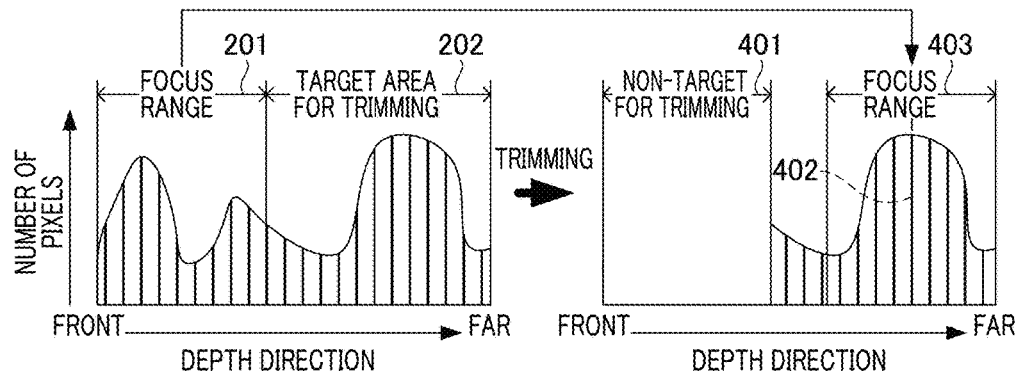
FIG. 11 is a diagram illustrating how a focus range changes with focusing on a depth position having the highest frequency before and after editing according to the second embodiment.

A description will be given of how a focus range changes after trim editing with respect to a LF image prior to trim editing with reference to FIG. 11. FIG. 11 shows the case when the focus range cannot be set to the entire area excluding a trimming non-target area 401 as a result of trim editing for a LF image prior to trim editing.

In this case, a focus range 403 is set as a focusable range in the depth direction and the front direction about a mode depth position 402 of the trimming area. Even when there is no object, which wants to be brought into focus, at the central portion of the trimmed area, focus can be made at the position according to the trim editing intention by such processing. Note that whether a focus range is determined from the center coordinate of the trimming area or a focus range is determined from the mode depth position of the trimming area can be selected by a user.

Third Embodiment

Next, a description will be given of a third embodiment of the present invention. In the third embodiment, the operations of the area analyzing unit 103 and the focus range determining unit 104 are different from those in the first embodiment. The area analyzing unit 103 analyzes an object (e.g., an image of a face of a person, a face of an animal such as a dog or cat, or the like) in the trimming area. When a plurality of objects are present in the trimming area, the area analyzing unit 103 analyzes an area in which each object is present. The area analyzing unit 103 not only performs processing described in the first embodiment but also sends information about an area in which each object is present, which is obtained as a result of the analysis described above, to the focus range determining unit 104. Although the focus range determining unit 104 sets the focus range to the entire trimming area, the entire area after trim editing may be unable to be brought into focus depending on LF image data prior to trim editing as described in the second embodiment.

The focus range determining unit 104 of the present embodiment determines the focus range after trim editing based on the number of objects present in the trimming area. When the number of objects included in the trimming area is one, the focus range is determined about the depth range over which the object is present. On the other hand, when the number of objects included in the trimming area is in plural, the focus range is determined such that all the objects are included therein.

Figure 12:
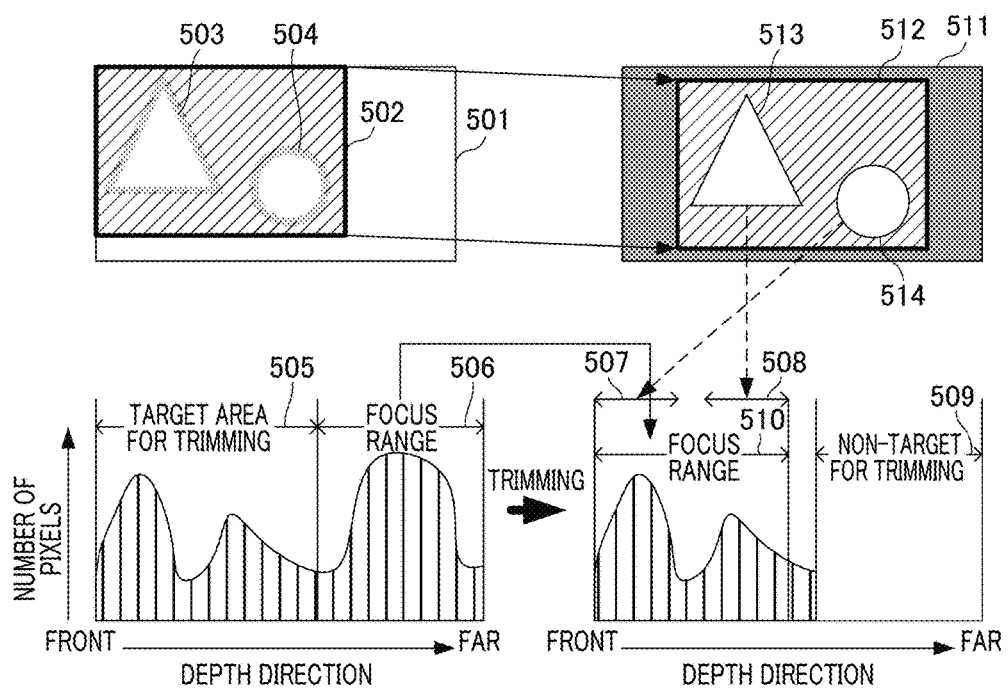
FIG. 12 is a diagram illustrating how a focus range changes before and after editing according to a third embodiment of the present invention.

A description will be given of how a focus range changes after trim editing with respect to a LF image prior to trim editing with reference to FIG. 12. FIG. 12 shows the case when a trimming area 502 is selected for trim editing with respect to the entire image 501 prior to trim editing. There are two objects, i.e., a triangle 503 and a circle 504 in the trimming area 502.

The aforementioned depth map with respect to the entire image prior to trim editing is shown in FIG. 12. A trimming target area 505 is present on the front side with respect to the objects as viewed from the photographer's side, whereas a focus range 506 prior to trim editing is outside the trimming target area 505. When trim editing is performed for the entire image 501, the area analyzing unit 103 detects the area for the triangle 503 and the circle 504 which are two objects included in the trimming area 502.

The focus range determining unit 104 determines a focus range 510 such that a range 508 on the depth map in which a triangle 513 is present and a range 507 on the depth map in which a circle 514 is present after trim editing are included therein. The focus range 506 is changed to the focus range 510 after trim editing. Thus, the triangle 503 and the circle 504 which are blurry prior to trim editing are respectively displayed as the triangle 513 and the circle 514 which are brought into focus in an area 512.

When a plurality of objects are present and it is difficult to include all the objects in a trimming area, the focus range determining unit 104 defines the priority of the objects in order of size. The focus range is determined such that an object having high priority is preferentially included therein. The focus range determining unit 104 also defines an object which is present at the center of the trimming area with high priority. For the definition of the priority, whether the priority is given to the size of an object or the center coordinate thereof can be selected by a user.

Fourth Embodiment

Next, a description will be given of a fourth embodiment of the present invention with reference to FIG. 13. While, in the first to third embodiments, a description has been given by taking an example of trimming as editing processing, the present invention is also applicable to the case when enlargement processing is performed. In other words, enlargement processing after shooting may be regarded as processing for setting a range which is desired to be displayed on an enlarged scale as a trimming area and for removing the remaining area.

Figure 13:
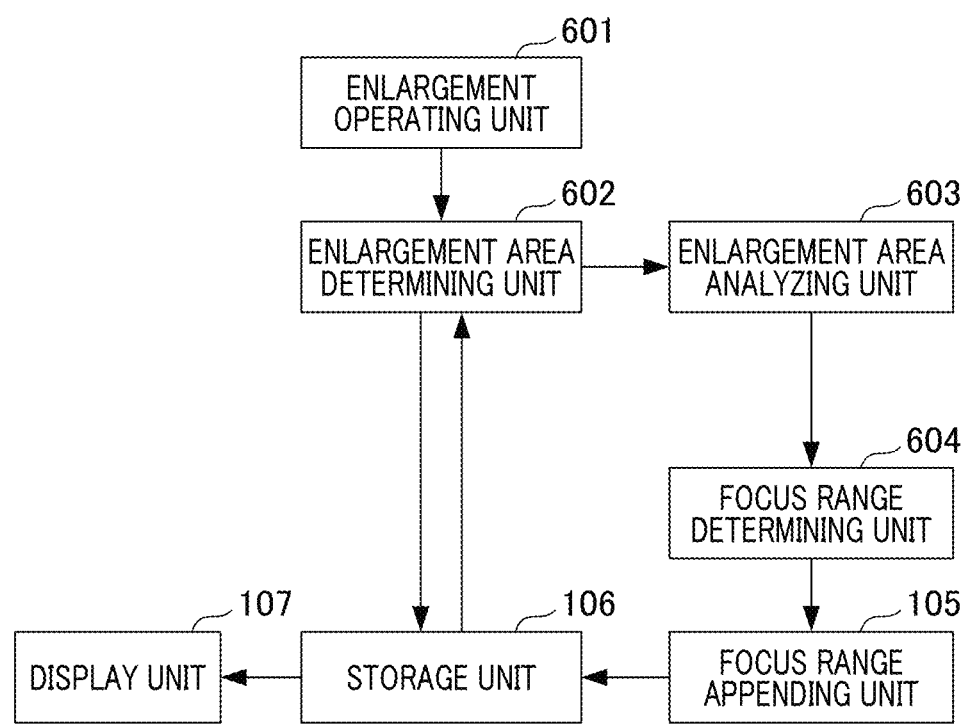
FIG. 13 is a block diagram illustrating a configuration of an apparatus according to a fourth embodiment of the present invention.

An enlargement operating unit 601 shown in FIG. 13 is an IF (interface) unit that is used by a user for directing an enlargement operation with respect to LF image data. The enlargement operating unit 601 is a typical input device such as a pointing device such as a mouse or a touch panel.

As a method for specifying an enlargement area, the center coordinate of an area desired to be enlarged or a rectangular frame is typically used for specification. As another method for specifying an enlargement area, a cross-shaped operating member may also be used for specifying an enlargement area in the vertical and horizontal directions. More specifically, an assumption is made that an area enlarged to an original image size is displayed in a state when a digital camera or the like performs during preview display or simple editing. Under this state, processing for changing a display area in the vertical and horizontal directions in accordance with a user's operating instruction is typically performed while the image is enlarged.

An enlargement area determining unit 602 determines an area to be enlarged based on the content specified by the enlargement operating unit 601 and an enlargement target (LF image data) stored in the storage unit 106. When the center coordinate is specified, an enlargement area is determined depending on a predetermined fixed enlargement ratio. The enlargement area determining unit 602 determines the area prior to enlargement as the enlargement area depending on the enlargement ratio. When a rectangular frame is specified as an enlargement area, the rectangular area is determined as the enlargement area.

When a user provides instructions to move a display image by the operation of a cross-shaped button or the like while the image is enlarged, the enlargement area is changed depending on the amount of change defined upon pressing of the cross-shaped button in each direction. For example, when the cross-shaped button is pressed in the right direction, it is assumed that the movement of the display image by a predetermined number of pixels (e.g. 50 pixels) is defined in advance in terms of an area prior to enlargement. In this case, when the enlargement operating unit 601 performs an operation in the right direction, an area is shifted by 50 pixels to the right direction from the enlargement area defined at that time.

Figure 14:
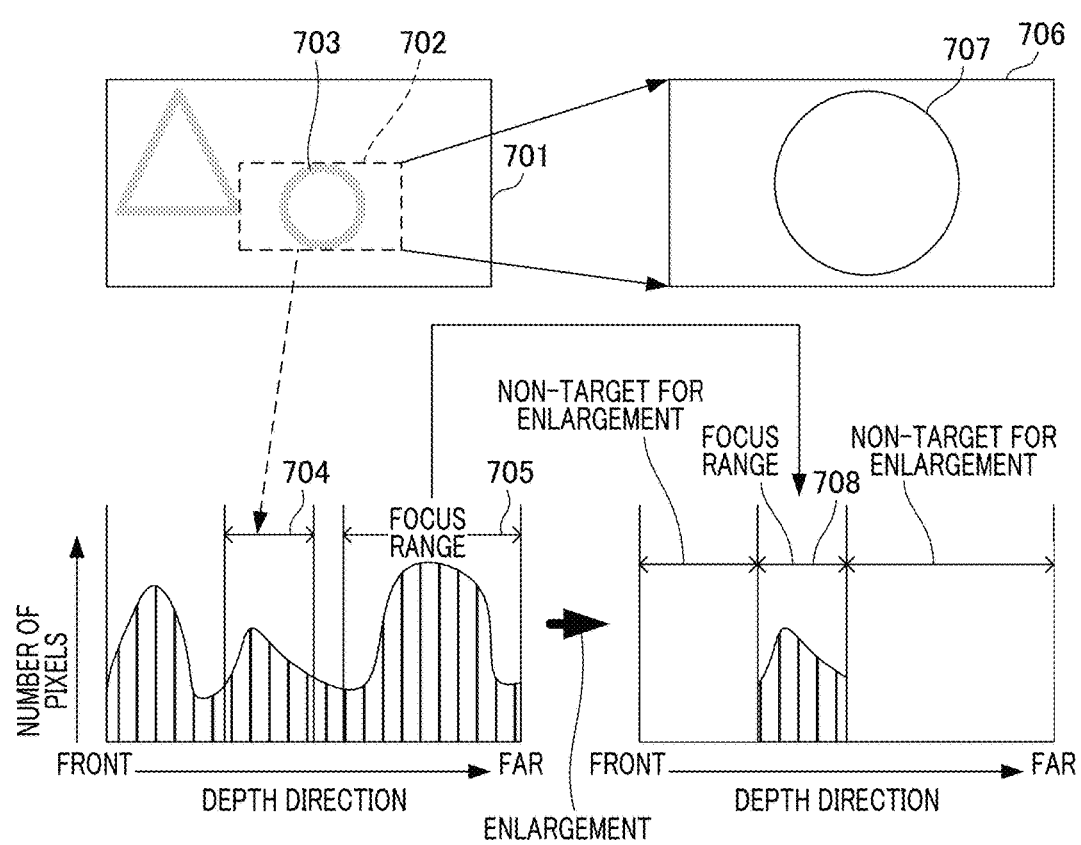
FIG. 14 is a diagram illustrating how a focus range changes before and after enlargement according to a fourth embodiment.

An enlargement area analyzing unit 603 acquires information about an enlargement area sent from the enlargement area determining unit 602, and then analyzes the content of LF image data of the enlargement area. In the present embodiment, the enlargement area on the depth map is analyzed. FIG. 14 shows an enlargement case and its depth map according to the present embodiment. In the present embodiment, processing is executed for a LF image 701 prior to enlargement by taking a target area in which a circle 703 is displayed as an enlargement area 702. As can be seen from the depth map of the image prior to enlargement, a far side area of a LF image prior to enlargement is in a focus range 705 as viewed from the photographer's side. A range 704 corresponding to the enlargement area 702 is present in a portion which is out of focus on the front side of the focus range 705. Thus, if the above processing is performed as it is, an image after enlargement becomes a blurry image.

The enlargement area analyzing unit 603 analyzes information about the enlargement area acquired from the enlargement area determining unit 602. In this manner, the enlargement target is determined to be present in the range 704 on the depth map. A focus range determining unit 604 determines a focus range based on the result of analysis from the enlargement area analyzing unit 603. A description will be given of how a focus range changes after enlargement processing with respect to a LF image prior to enlargement processing with reference to FIG. 14. In the state of a display image 706 after enlargement processing, the focus range 705 prior to enlargement processing is changed to the position of the range 704 on the depth map in which the enlargement area 702 is present, and thus, becomes a focus range 708. Consequently, the circle 703 which is blurry prior to enlargement processing is displayed as a circle 707 which is brought into focus after enlargement processing.

When a user performs an enlargement operation, it is often the case that the user wants to focus on an area to be enlarged. According to the present embodiment, focus is automatically adjusted to the enlargement area when the enlargement operation is performed by the above processing, resulting in an increase in convenience of use for the user.

OTHER EMBODIMENTS

Embodiments of the present invention can also be realized by a computer of a system or an apparatus that reads out and executes computer executable instructions recorded on a storage medium (e.g., a non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus that performs image processing on an image with respect to light-field image data, the image having a plurality of pixels, the light-field image data (i) being stored after shooting the image and (ii) having a focus state that is changeable after the shooting of the image, the image processing apparatus comprising:
   (A) a processor; and
   (B) a memory storing a program which, when executed by the processor, causes the processor to function as:
      (a) a specifying unit configured to specify a trimming area of the image with respect to the stored light-field image data, the trimming area being an area of the image that is out of focus, and the trimming area having at least one depth position on a depth map, the depth map indicating the depth position for each pixel of the plurality of pixels of the image with respect to the stored light-field image data;
      (b) an acquiring unit configured to acquire information indicating a depth position to be focused in the specified trimming area, by using the depth map;
      (c) a generating unit configured to generate edited light-field image data by trimming a portion of the stored light-field image data that relates to the specified trimming area;
      (d) a storing unit configured to store, in a storage, the information acquired by the acquiring unit together with the edited light-field image data;
      (e) a focusing unit configured to bring the specified trimming area into focus based on the depth position indicated by the information acquired by the acquiring unit; and
      (f) an output unit configured to output, to a display unit, an image that includes the specified trimming area that is brought into focus by the focusing unit.

2. The image processing apparatus according to claim 1, wherein the acquiring unit analyzes a characteristic of partial image data of the specified trimming area and determines the depth position over which the specified trimming area is brought into focus.

3. The image processing apparatus according to claim 1, wherein the acquiring unit analyzes a center coordinate of the specified trimming area, and determines the depth position over which the specified trimming area is brought into focus based on the depth position in which a pixel at the center coordinate is present.

4. The image processing apparatus according to claim 2, wherein the acquiring unit analyzes the characteristic related to the depth position of the partial image data of the specified trimming area by generating the depth map based on the light-field image data.

5. The image processing apparatus according to claim 2, wherein the acquiring unit analyzes the depth position having a highest frequency in the specified trimming area, when a number of pixels is set as a frequency, and determines the depth position over which the specified trimming area is brought into focus based on the analyzed depth position.

6. The image processing apparatus according to claim 1, wherein the acquiring unit analyzes a position of an object in the specified trimming area, and determines the depth position over which the specified trimming area is brought into focus based on the position of the object.

7. The image processing apparatus according to claim 1, wherein the light-field image data includes information indicating an intensity and a direction of light relating to a captured image.

8. The image processing apparatus according to claim 1, wherein the storing unit appends the information acquired by the acquiring unit to the light-field image data after trimming editing, which is generated by trimming a portion of the light-field image data, and stores the information.

9. The image processing apparatus according to claim 1, wherein, if a number of a predetermined object included in the specified trimming area is one, the acquiring unit determines a depth position at which the object is brought into focus with the depth position of the one predetermined object as a center.

10. The image processing apparatus according to claim 9, wherein, if a number of a predetermined object included in the specified trimming area is plural, the acquiring unit determines the depth position at which the object is brought into focus so as to include the respective depth positions of a plurality of predetermined objects.

11. The image processing apparatus according to claim 9, wherein, if a number of a predetermined object included in the specified trimming area is plural, the acquiring unit determines the depth position at which the object is brought into focus by priority, by order of size of each of a plurality of predetermined objects.

12. The image processing apparatus according to claim 9, wherein, if a number of a predetermined object included in the specified trimming area is plural, the acquiring unit determines the depth position at which the object is brought into focus by priority, using a predetermined object located at the center of the specified trimming area.

13. The image processing apparatus according to claim 1, wherein at least one predetermined object included in the specified trimming area is a face.

14. The image processing apparatus according to claim 1, wherein the focusing unit brings the specified trimming area into focus by reconstructing the edited light-field image data using the information acquired by the acquiring unit.

15. A non-transitory computer-readable storage medium storing a program for causing a computer to execute a control method to be executed by an image processing apparatus that performs image processing on an image with respect to light-field image data, the image having a plurality of pixels, the light-field image data (i) being stored after shooting the image and (ii) having a focus state that is changeable after the shooting of the image, the control method comprising:
specifying a trimming area of the image with respect to the stored light-field image data, the trimming area being an area of the image that is out of focus, and the trimming area having at least one depth position on a depth map, the depth map indicating the depth position for each pixel of the plurality of pixels of the image with respect to the stored light-field image data;
acquiring information indicating a depth position to be focused in the specified trimming area, by using the depth map;
generating edited light-field image data by trimming a portion of the stored light-field image data that relates to the specified trimming area;
storing the acquired information together with the edited light-field image data;
bringing the specified trimming area into focus based on the depth position indicated by the acquired information; and
outputting an image that includes the specified trimming area that is brought into focus.

16. The non-transitory computer-readable storage medium according to claim 15, wherein a characteristic of partial image data of the specified trimming area is analyzed, and the depth position over which the specified trimming area is brought into focus is determined.

17. The non-transitory computer-readable storage medium according to claim 15, wherein a center coordinate of the specified trimming area is analyzed and the depth position over which the specified trimming area is brought into focus is determined based on the depth position in which a pixel at the center coordinate is present.

18. The non-transitory computer-readable storage medium according to claim 16, wherein the characteristic related to the depth position of the partial image data of the specified trimming area is analyzed by generating the depth map based on the light-field image data.

19. The non-transitory computer-readable storage medium according to claim 16, wherein the depth position having a highest frequency in the specified trimming area, when a number of pixels is set as a frequency, is analyzed, and the depth position over which the specified trimming area is brought into focus is determined based on the analyzed depth position.

20. The non-transitory computer-readable storage medium according to claim 15, wherein a position of an object in the specified trimming area is analyzed, and the depth position over which the specified trimming area is brought into focus is determined based on the position of the object.

21. The non-transitory computer-readable storage medium according to claim 15, wherein the light-field image data includes information indicating an intensity and a direction of light relating to a captured image.

22. The non-transitory computer-readable storage medium according to claim 15, wherein the acquired information is appended to the light-field image data after trimming editing, which is generated by trimming a portion of the light-field image data, and the acquired information is stored.

23. The non-transitory computer readable storage medium according to claim 15, wherein, if a number of a predetermined object included in the specified trimming area is one, a depth position at which the object is brought into focus is determined with respect to the depth position of the one predetermined object as a center.

24. The non-transitory computer readable storage medium according to claim 23, wherein, if a number of a predetermined object included in the specified trimming area is plural, the depth position at which the object is brought into focus is determined so as to include the respective depth positions of a plurality of predetermined objects.

25. The non-transitory computer readable storage medium according to claim 23, wherein, if a number of a predetermined object included in the specified trimming area is plural, the depth position at which the object is brought into focus is determined by priority, by order of size of each of a plurality of predetermined objects.

26. The non-transitory computer readable storage medium according to claim 23, wherein, if a number of a predetermined object included in the specified trimming area is plural, the depth position at which the object is brought into focus is determined by priority, using a predetermined object located at the center of the specified trimming area.

27. The non-transitory computer readable storage medium according to claim 15, wherein at least one predetermined object included in the specified trimming area is a face.

28. The non-transitory computer-readable storage medium according to claim 15, wherein the specified trimming area is brought into focus by reconstructing the edited light-field image data using the acquired information.

29. A method of performing image processing on an image with respect to light-field image data, the image having a plurality of pixels, the light-field image data (i) being stored after shooting the image and (ii) having a focus state that is changeable after the shooting of the image, the method comprising:

(a) specifying a trimming area of the image with respect to the stored light-field image data, the trimming area being an area of the image that is out of focus, and the trimming area having at least one depth position on a depth map, the depth map indicating the depth position for each pixel of the plurality of pixels of the image with respect to the stored light-field image data;

(b) acquiring information indicating a depth position to be focused in the specified trimming area, by using the depth map;

(c) generating edited light-field image data by trimming a portion of the stored light-field image data that relates to the specified trimming area;

(d) storing the acquired information together with the edited light-field image data;

(e) bringing the specified trimming area into focus based on the depth position indicated by the acquired information; and (f) outputting an image that includes the specified trimming area that is brought into focus.

30. The method of performing image processing according to claim 29, wherein the specified trimming area is brought into focus by reconstructing the edited light-field image data using the acquired information.

* * * * *